United States Patent
Ishii et al.

(10) Patent No.: US 11,901,939 B2
(45) Date of Patent: Feb. 13, 2024

(54) OPTICAL RECEIVER AND OPTICAL TRANSCEIVER MODULE

(71) Applicant: FUJITSU OPTICAL COMPONENTS LIMITED, Kawasaki (JP)

(72) Inventors: Toshio Ishii, Yokohama (JP); Naoki Kuwata, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/897,867

(22) Filed: Aug. 29, 2022

(65) Prior Publication Data

US 2023/0098306 A1 Mar. 30, 2023

(30) Foreign Application Priority Data

Sep. 27, 2021 (JP) ................................ 2021-157014

(51) Int. Cl.
*H04B 10/06* (2006.01)
*H04B 10/079* (2013.01)
(Continued)

(52) U.S. Cl.
CPC ....... *H04B 10/07955* (2013.01); *H04B 10/40* (2013.01); *H04B 10/60* (2013.01); *H04J 14/02* (2013.01)

(58) Field of Classification Search
CPC .. H04B 10/40; H04B 10/07955; H04B 10/60; H04B 10/0795; H04B 10/0797;
(Continued)

(56) References Cited

U.S. PATENT DOCUMENTS

| 8,737,848 B2* | 5/2014 | Ikeuchi | H04B 10/673 |
| | | | 398/208 |
| 2010/0142958 A1* | 6/2010 | Matsumoto | H04J 14/0221 |
| | | | 398/79 |

(Continued)

FOREIGN PATENT DOCUMENTS

| JP | 2012-105221 | 5/2012 |
| JP | 2012-165127 | 8/2012 |

*Primary Examiner* — Hanh Phan
(74) *Attorney, Agent, or Firm* — STAAS & HALSEY LLP (57) ABSTRACT

An optical receiver includes an optical amplifier that amplifies a received optical signal containing multiple wavelengths, a monitor circuit that monitors light intensities of the demultiplexed optical signal, a processor, and a memory having information representing a relationship between a total incident light intensity of the optical signal incident onto the optical amplifier and gains of the optical amplifier for the respective wavelengths. The processor repeats first calculation for determining the gains of the respective wavelengths from the memory, based on a drive current for driving the optical amplifier and an estimation value of the total incident light intensity of the optical signal, second calculation for calculating the incident light intensities of the respective wavelengths of the optical signal based on the gains and the monitored light intensities, and third calculation to calculate the total incident light intensity of the optical signal, until the total incident light intensity converges.

12 Claims, 9 Drawing Sheets

(51) Int. Cl.
*H04B 10/40* (2013.01)
*H04B 10/60* (2013.01)
*H04J 14/02* (2006.01)

(58) Field of Classification Search
CPC ............. H04B 10/2507; H04B 10/291; H04B 10/671; H04B 10/672; H04B 10/673; H04B 10/674; H04J 14/02
USPC ... 398/202, 208, 209, 210, 213, 214, 33, 38, 398/34, 37, 135, 136, 137, 138, 139, 158, 398/159, 25, 26, 27, 160, 162, 79
See application file for complete search history.

(56) References Cited

U.S. PATENT DOCUMENTS

| | | |
|---|---|---|
| 2011/0243576 A1 | 10/2011 | Oomori |
| 2012/0121259 A1* | 5/2012 | Kuwata ................ H04B 10/673 398/38 |

* cited by examiner

OPTICAL RECEIVER AND OPTICAL TRANSCEIVER MODULE

CROSS-REFERENCE TO RELATED APPLICATIONS

This application is based upon and claims priority to earlier Japanese Patent Application No. 2021-157014 filed Sep. 27, 2021, which is incorporated herein by reference in its entirety.

FIELD

The present documents relate to an optical receiver and an optical transceiver module.

BACKGROUND

One of the technologies for dealing with the increasing traffic in data communication is a fiber-optic transmission named wavelength division multiplexing (WDM). WDM can improve the transmission rate per optical fiber by multiplexing light signals of a plurality of wavelengths onto a single optical fiber. A receiver-side device amplifies the received WDM signal as necessary using a semiconductor optical amplifier (SOA) or other types of amplifiers, prior to demultiplexing the WDM signal into the respective wavelengths.

Figure 1:
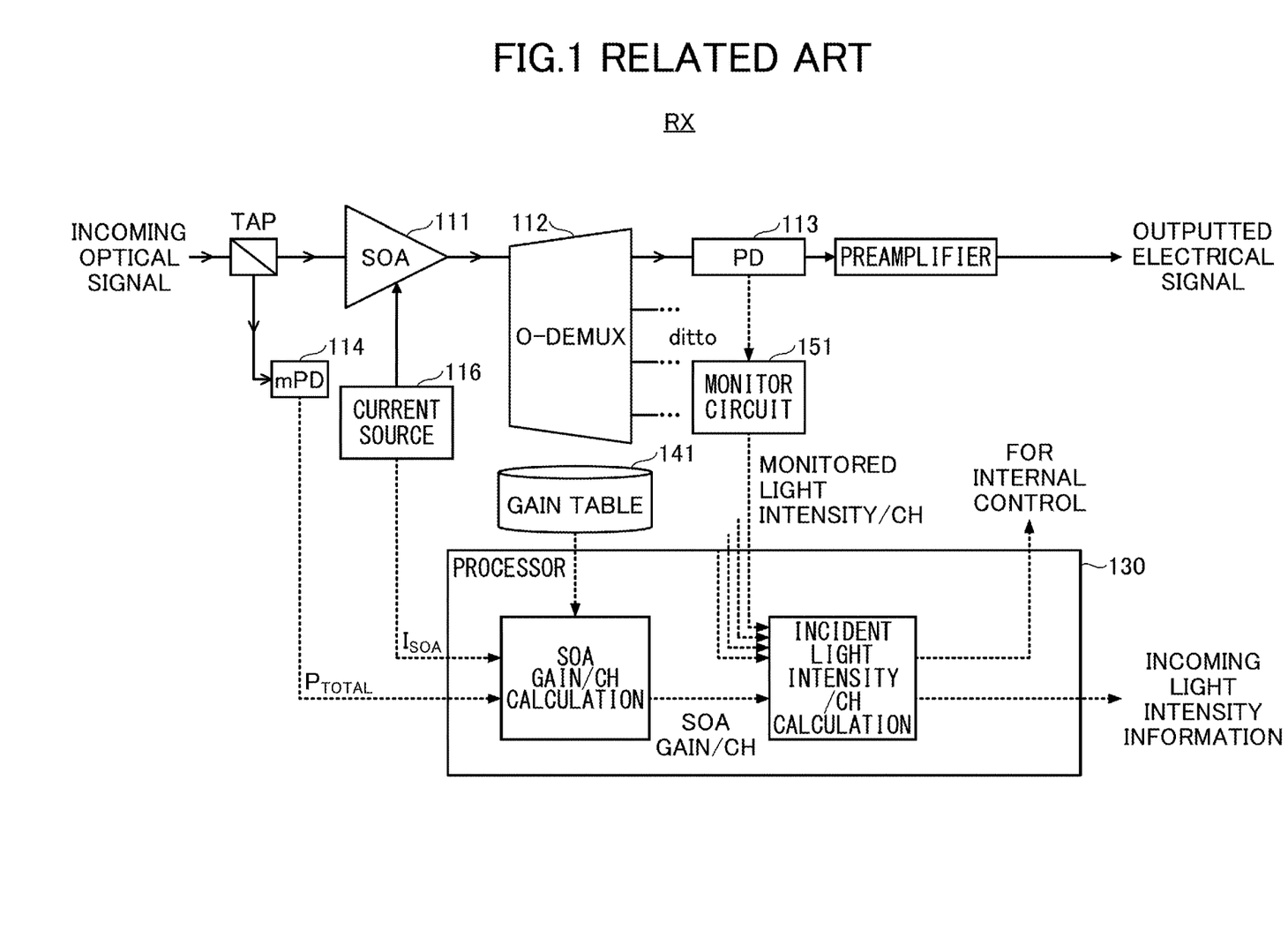
FIG. 1 illustrates a typical optical receiver with a built-in SOA used in a WDM communication apparatus.

FIG. 1 illustrates an optical receiver RX with a built-in SOA, used in a WDM communication apparatus. An incoming optical signal, namely, a received WDM signal is amplified by the SOA 111 before the WDM signal is demultiplexed into the respective wavelengths by the optical demultiplexer 112 (denoted as "O-DEMUX" in the figure). The gain of the SOA 111 depends not only on the drive current $I_{SOA}$ of the current source 116 for driving the SOA 111, but also on the total incident light intensity (denoted as "$P_{TOTAL}$" in the figure) incident onto the SOA 111. Accordingly, a monitoring photodetector (denoted as "mPD" in the figure) 114 is provided at the incident side of the SOA 111 to detect the total incident light intensity onto the SOA 111. See, for example, Patent Document 1 presented below. In addition, a monitor circuit 151 is provided at the output side of the optical demultiplexer 112 to monitor the light intensities of the demultiplexed signals of the respective wavelengths (i.e., channels), detected by the associated photodetectors (each denoted as "PD" in the figure) 113.

The processor 130 calculates the SOA gains of the respective channels, based on the total incident light intensity $P_{TOTAL}$ of the SOA 111 and the drive current $I_{SOA}$, with reference to the gain table 141. The processor 130 also calculates the incident light intensity of the individual channel incident onto the SOA 111, based on the SOA gain and the monitored light intensity of that channel. The incident light intensities of the respective channels are reported as incoming light information to the WDM communication apparatus, or used for internal control on the optical receiver RX or some other purposes.

Meanwhile, down-sizing of QSFP 100 G modules for over-40 km transmission is demanded, and especially, curtailment of the parts and components for acquiring the incident light intensities of the WDM channels is required. However, without the tap splitter and the monitor photodetector at the incident side of the SOA, it is difficult to correctly determine the incident light intensities of the individual channels, and eventually, the internal control at the optical receiver and/or notification to the communication apparatus which incorporates the optical receiver will be hindered.

It is desirable for an optical receiver to accurately detect the incident light intensities of the respective WDM channels or wavelengths, as well as the total incident light intensity of the received WDM signal.

Related art document described above is
Patent Document 1: Japanese Patent Application Laid-open Publication No. 2012-105221.

SUMMARY

In an embodiment, an optical receiver includes
an optical amplifier that amplifies an optical signal in which multiple wavelengths are multiplexed,
a current source that drives the optical amplifier,
an optical demultiplexer that demultiplexes the amplified optical signal into the multiple wavelengths,
photodetectors, each detecting one of the demultiplexed wavelengths,
a monitor circuit that monitors light intensities of the demultiplexed wavelengths detected by the photodetectors,
a processor, and
a memory,
wherein the memory has information representing a relationship between a total incident light intensity of the optical signal incident onto the optical amplifier and a gain of the optical amplifier for each of the multiple wavelengths, and
wherein the processor repeats
first calculation for determining the gain of each of the multiple wavelengths of the optical signal, with reference to the information in the memory, based on a drive current of the current source and an estimation value of the total incident light intensity of the optical signal incident onto the optical amplifier,
second calculation for calculating an incident light intensity of each of the multiple wavelengths of the optical signal incident onto the optical amplifier, based on the determined gain of each of the multiple wavelengths and a monitored light intensity of each of the demultiplexed wavelengths acquired from the monitor circuit, and
third calculation for calculating the total incident light intensity of the optical signal incident onto the optical amplifier based on a sum of incident light intensities of the multiple wavelengths acquired by the second calculation, until the total incident light intensity converges.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

EMBODIMENTS

In an embodiment, channel-based (or wavelength-based) light intensities of a WDM signal, and the total light intensity of that WDM signal incident onto a SOA are accurately detected, without providing a monitoring mechanism at the incident side of the SOA of an optical receiver. Such an optical receiver can be used in an optical transceiver module for over-40 km (or even over-80 km) transmission. Specifically, SOA drive current information and a provisional value of the total incident light intensity of the WDM signal incident onto the SOA (which may be referred to simply as "SOA total incident light intensity") are used to determine the SOA gains of the respective channels, referring to the gain information saved in a memory. Using the determined SOA gains of the respective channels and the light intensity monitoring result of the demultiplexed WDM signal, the light intensities of the respective channels (which may be referred to as "channel-based incident light intensities") and the total light intensity of the WDM signal incident onto the SOA are estimated. Based on the estimated SOA total incident light intensity, the SOA gains of the respective channels are determined again, and the channel-based incident light intensities and the SOA total incident light intensity are recalculated. By repeating these steps, a convergence point of the estimation of the total incident light intensity of the WDM signal incident onto the SOA is determined.

Figure 2:
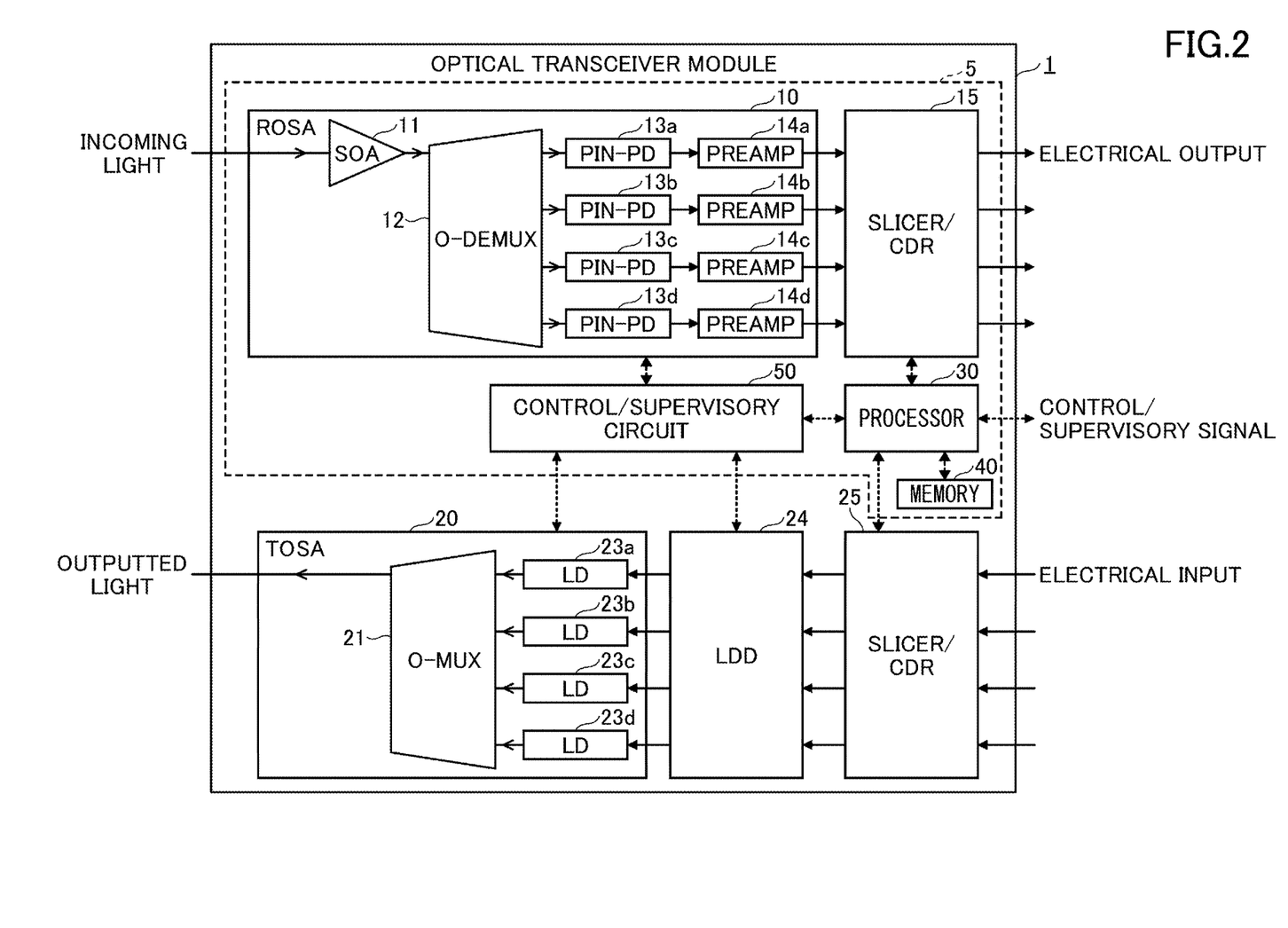
FIG. 2 is a schematic diagram of an optical transceiver module having an optical receiver according to an embodiment.

FIG. 2 is a schematic diagram of an optical transceiver module 1 which includes the optical receiver 5 according to the embodiment. The optical transceiver module 1 is, for example, a 100 G transmission module of an intensity modulation scheme such as Non-Return-to-Zero (NRZ). The optical transceiver module 1 is not limited to this example, and it may be a 400G communication module of a quadrature pulse amplitude modulation (PAM4) scheme.

The optical receiver 5 has a receiver optical subassembly (ROSA) 10 as a receiver frontend circuit, and a slicer/clock data recovery (CDR) circuit 15 which is an electronic circuit connected to the output of the ROSA 10. The optical receiver 5 also includes a processor 30, a memory 40, and a control/supervisory circuit 50. The processor 30, the memory 40, and the control/supervisory circuit 50 may be used in common with transmitter components of the optical transceiver module 1.

The ROSA 10 has a SOA 11, an optical demultiplexer 12, photodetectors 13a to 13d, and preamplifiers 14a to 14d (each abbreviated as "PREAMP" in the figure). Each of the photodetectors 13a to 13d and each of the preamplifiers 14a to 14d are provided for each of the demultiplexed channels. The ROSA 10 converts the received optical signal of each channel into an electric signal. The photodetectors 13a to 13d are, for example, PIN photodiodes (denoted as "PIN-PD" in the figure). The photocurrents detected by the photodetectors 13a to 13d are amplified by the corresponding preamplifiers 14a to 14d, and output from the ROSA 10 as analog voltage signals.

In the configuration example of FIG. 2, the ROSA 10 is a small optical component that does not have a monitoring mechanism at the incident side of the SOA 11. The processor 30 repeatedly estimates the incident light intensities of the respective channels and the total incident light intensity of the received WDM signal, using a provisional value of the total incident light intensity of the WDM signal incident onto the SOA 11, until the estimated values converge. This process will be described in more detail with reference to FIG. 3. The information about the incident light intensities of the respective channels, which has been acquired as a convergence result, may be supplied as a module control and supervisory signal to a communication apparatus to which the optical transceiver module 1 is connected, or it may be used for internal control on the optical receiver 5 via the control/supervisory circuit 50.

The analog voltage signal output from the ROSA 10 is regenerated as a digital data stream by the slicer/CDR circuit 15, and the clock is reproduced from the digital data string. The digital data stream is output as a high-speed main electrical signal from the optical receiver 5.

At the transmitter side of the optical transceiver module 1, the data signals of the respective channels to be transmitted are input to the slicer/CDR circuit 25 as electrical input. The outputs of the slicer/CDR circuit 25 are connected to the inputs of the laser diode driver (LDD) 24. The LDD 24 converts the inputted digital electrical signals into drive signals for optical modulation.

The drive signals output from the LDD 24 are supplied to a transmitter optical subassembly (TOSA) 20 which is a transmitter frontend circuit. The TOSA 20 has LDs 24a to 24d as light sources. The light beams emitted from the LDs 24a to 24d are directly modulated by the corresponding drive signals. The modulated optical signals of the respective channels are multiplexed by an optical multiplexer (denoted as "O-Mux" in the figure) 21, and transmitted as a WDM signal from the optical transceiver module 1.

Although a 4-channel WDM optical transceiver module 1 is illustrated in FIG. 2, the number of channels to be multiplexed is not limited to four. A WDM communication module handling as many channels as needed, such as 8 channels, 16 channels or more, can be configured.

Figure 3:
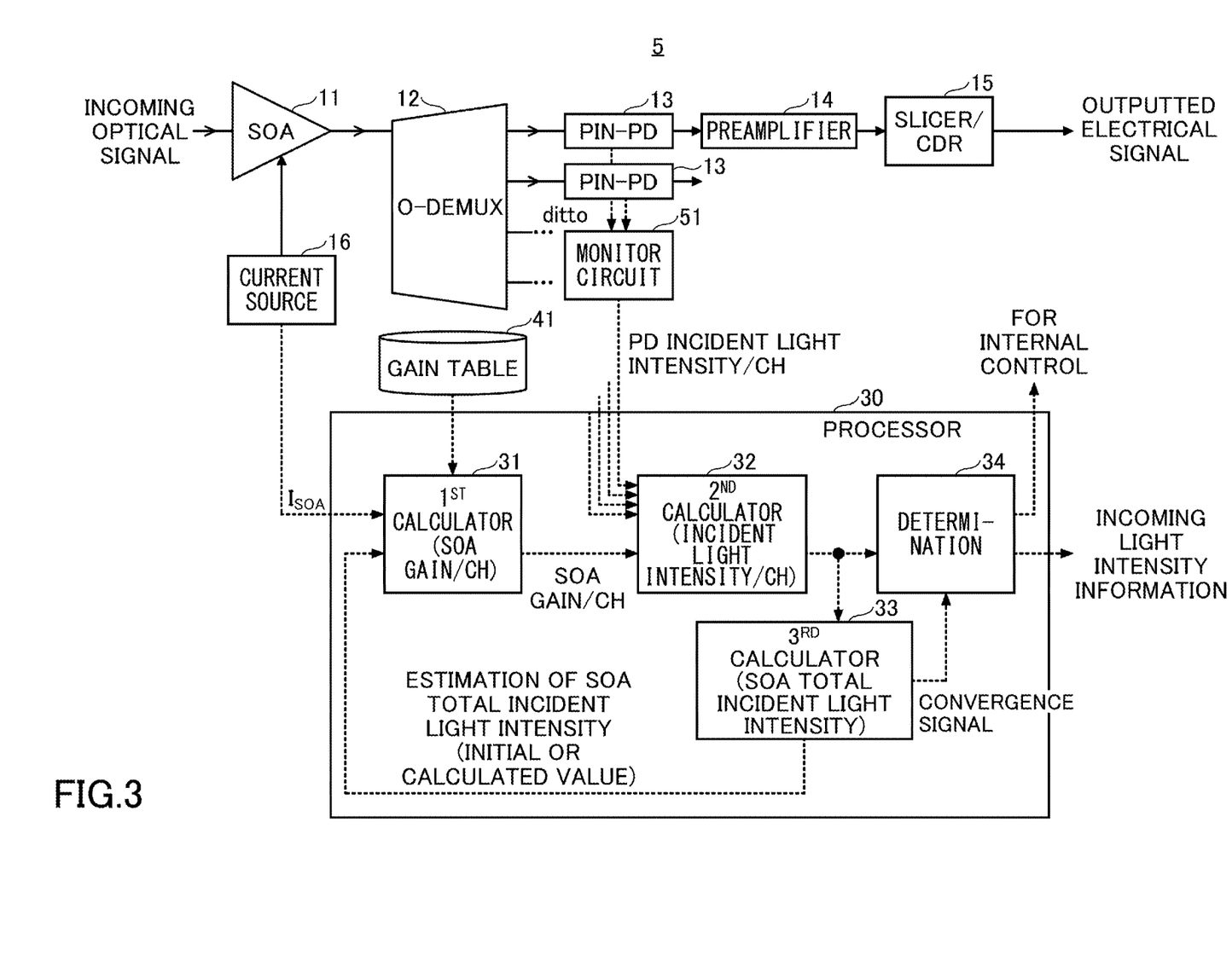
FIG. 3 is a schematic diagram of an optical receiver of the embodiment.

FIG. 3 is a schematic diagram of the optical receiver 5. The optical signal received at the optical receiver 5 is amplified by the SOA 11. The SOA 11 is driven by the drive current supplied from the current source 16. The drive current $I_{SOA}$ for driving the SOA 11 is reported to the processor 30. The signal lights of multiple wavelengths (i.e., channels) contained in the WDM signal are amplified by the SOA 11, and demultiplexed by the optical demultiplexer 12. The demultiplexed signal lights of the respective channels are detected by the associated PIN-PDs 13, and converted by the corresponding preamplifiers 14 into voltage signals. The voltage signals of the respective channels are regenerated as digital data streams by the slicer/CDR circuit 15, and output as high-speed electrical signals.

A portion of the photocurrent detected by each of the PIN-PDs 13 is monitored by the monitor circuit 51. The monitoring result by the monitor circuit 51 is supplied as PD incident light intensities of the respective channels to the processor 30.

The processor 30 serves as a first calculator 31 that determines the SOA gains of the individual channels, a second calculator 32 that calculates the incident light intensities of the respective channels of the WDM signal incident onto the SOA 11, a third calculator 33 that calculates the total incident light intensity of the WDM signal incident onto the SOA 11, and a determination part 34.

The first calculator 31 determines the SOA gains of the respective channels with reference to the gain table 41, based on the SOA drive current $I_{SOA}$. The gain table 41 is saved in the memory 40, and it describes the gain characteristics of the respective channels. In order to determine the SOA gains of the respective channels, the total light intensity of the WDM signal incident onto the SOA 11 is required, in addition to the SOA drive current $I_{SOA}$.

No monitoring mechanism is provided at the incident side of the SOA 11 in the optical receiver 5, and accordingly, a provisional value is initially used as the provisional initial value of the SOA total light intensity of the WDM signal incident onto the SOA 11. Even if a certain kind of monitoring mechanism is provided for some purpose at the incident side of the SOA 11, the channel-based SOA incident light intensities of the respective channels can be determined using the provisional value of the SOA total incident light intensity, without using such a monitoring mechanism placed before the SOA. The provisional value of the SOA total incident light intensity may be a randomly selected value, a designed value for the fiber-optic transmission system, an estimated value through calculation, or any other suitable values. The first calculator 31 determines the SOA gains of the respective channels with reference to the gain table 41, based on the SOA drive current $I_{SOA}$ and the provisional value of the SOA total incident light intensity. The details of the gain table 41 will be described later.

The second calculator 32 calculates the incident light intensities of the respective channels of WDM signal incident onto the SOA 11, based on the channel-based PD incident light intensities supplied from the monitor circuit 51 and the SOA gains of the respective channels supplied from the first calculator 31.

The third calculator 33 calculates the SOA total incident light intensity based on the light intensities of the respective channels calculated by the second calculator 32. The calculated value of the SOA total incident light intensity is fed back to the first calculator 31, and used for redetermination of the SOA gains of the respective channels. The calculations by the first calculator 31, the second calculator 32, and the third calculator 33 are repeated until the SOA total incident light intensity converges. Each time the calculation is iterated, the estimated value of the SOA total incident light intensity is updated by the determination unit 34.

The third calculator 33 checks the convergence state of the SOA total incident light intensity. Upon convergence of the estimation value of the SOA total incident light intensity, the third calculator 33 outputs a convergence signal to the determination part 34. Upon reception of the convergence signal from the third calculator 33, the determination part 34 fixes the estimation values of the incident light intensities of the respective channels, and outputs the fixed values of the incident light intensities of the respective channels. The incident light intensities of the respective channels are reported as incoming light information, such as module control/supervisory signals, to the communication apparatus to which the optical transceiver module 1 is connected, or they may be used for internal control of the optical receiver 5 via the control/supervisory circuit 50.

Figure 4:
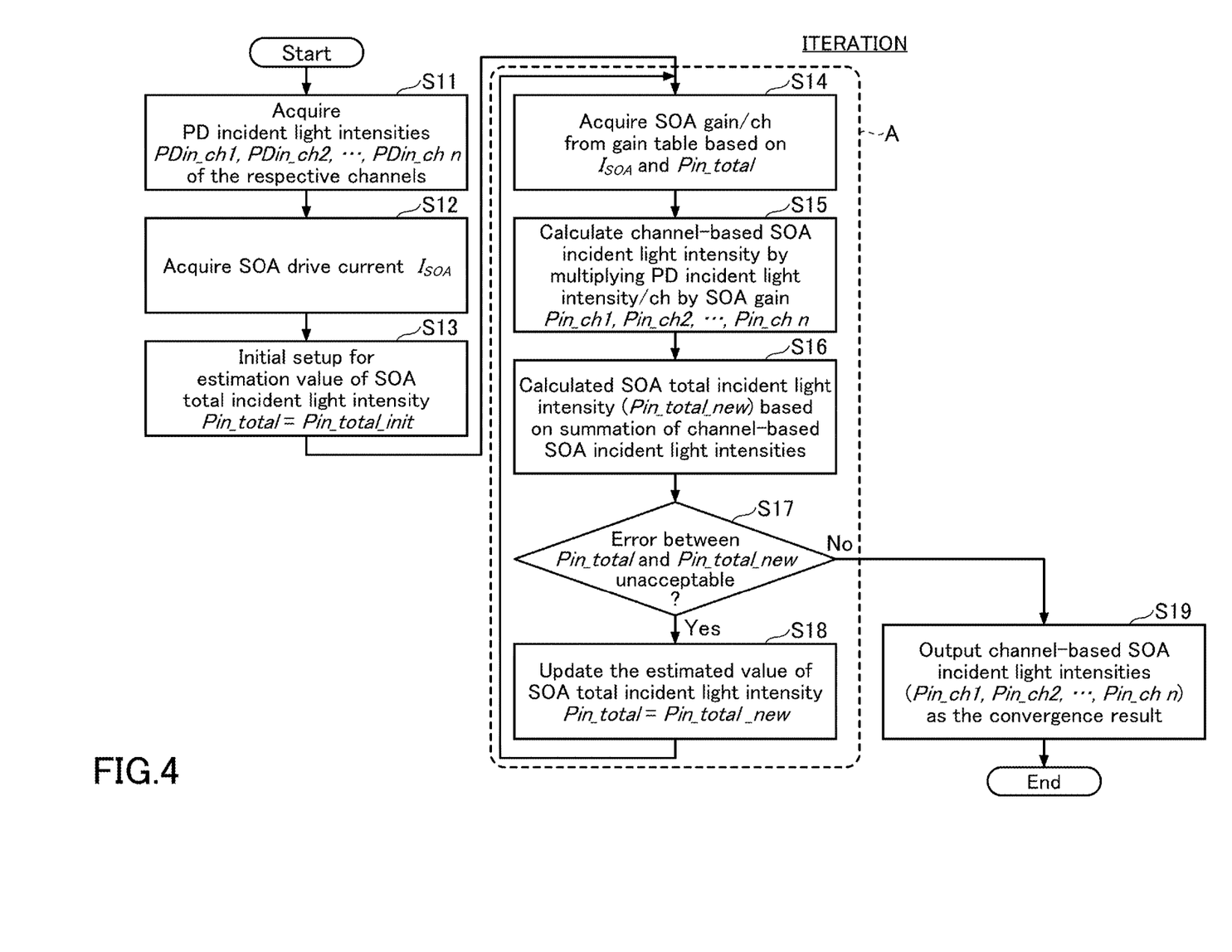
FIG. 4 is a flowchart of a process executed by a processor of the optical receiver.

FIG. 4 is a flowchart of a process implemented by the processor 30. The processor 30 acquires PD incident light intensities PDin_ch1, PDin_ch2, ..., PDin_ch n of the respective channels from the monitor circuit 51 (S11). The PD incident light intensities represent the power levels of the signal lights incident onto the PIN-PD13a to PIN-13d after being demultiplexed by the optical demultiplexer 12.

The processor 30 acquires the SOA drive current value $I_{SOA}$ configured in the current source 16 (S12). The processor 30 sets up the initial value Pin_total_init as the initial estimation value Pin_total of the total incident light intensity of the WDM signal incident onto the SOA 11 (S13). Steps S11 to S13 may be performed in arbitrary sequence, or may be simultaneously performed.

Then, the SOA gain of an individual channel is acquired from the gain table 41, based on the SOA drive current $I_{SOA}$ and the provisional value of the SOA total incident light intensity Pin_total (or Pin_total_init for the first round) (S14). Each of the incident light intensities Pin_ch1, Pin_ch2, ..., Pin_ch n is calculated by multiplying the SOA gain of the corresponding channel and the PD incident light intensity of that channel acquired by the monitor circuit 51 (S15). The signal intensity of each wavelength incident onto the SOA 11 is expressed by the product of the power level detected by the corresponding PIN-PD 13 and the SOA gain of the associated channel.

Then, a new SOA total incident light intensity Pin_total_new is calculated from the summation of the incident light intensities of the respective channels incident onto the SOA (S16). If the error between the currently calculated Pin_total_new and the previously configured Pin_total is out of the acceptable range (Yes in S17), the estimation value of the SOA total incident light intensity is updated (S18). Then, the process returns to step S14, and steps S14 to S18 are repeated until the error between the currently calculated Pin_total_new and the previously configured Pin_total is within the acceptable range (No in S17). This iteration may be referred to as "iterative estimation process A."

If the error between the currently calculated Pin_total_new and the previously configured Pin_total is within the acceptable range, the calculated SOA incident light intensities Pin_ch1, Pin_ch2, ..., Pin_ch n of the respective channels are output (S19). The convergence of the SOA total incident light intensity through the iteration is extremely fast as will be described later, and the SOA incident light intensities of the respective channels can be estimated quickly and accurately, without providing a monitoring mechanism at the incident side of the SOA 11.

The process of FIG. 4 is repeatedly performed by the processor 30 in the actual service. The intensity of the WDM signal received at the optical receiver 5 may vary due to degradation of the sender-side communication apparatus over time or fluctuation on the fiber-optic transmission lines. In spite of such degradation or fluctuation in the WDM signal intensity, the incident light intensities of the respective channels of the WDM signal incident onto the SOA 11 are correctly detected at the optical receiver 5 of the embodiment, even without a monitoring mechanism at the incident side of the SOA 11. Thus, the control and supervising operations of the optical receiver 5 are maintained reliably.

Figure 5:
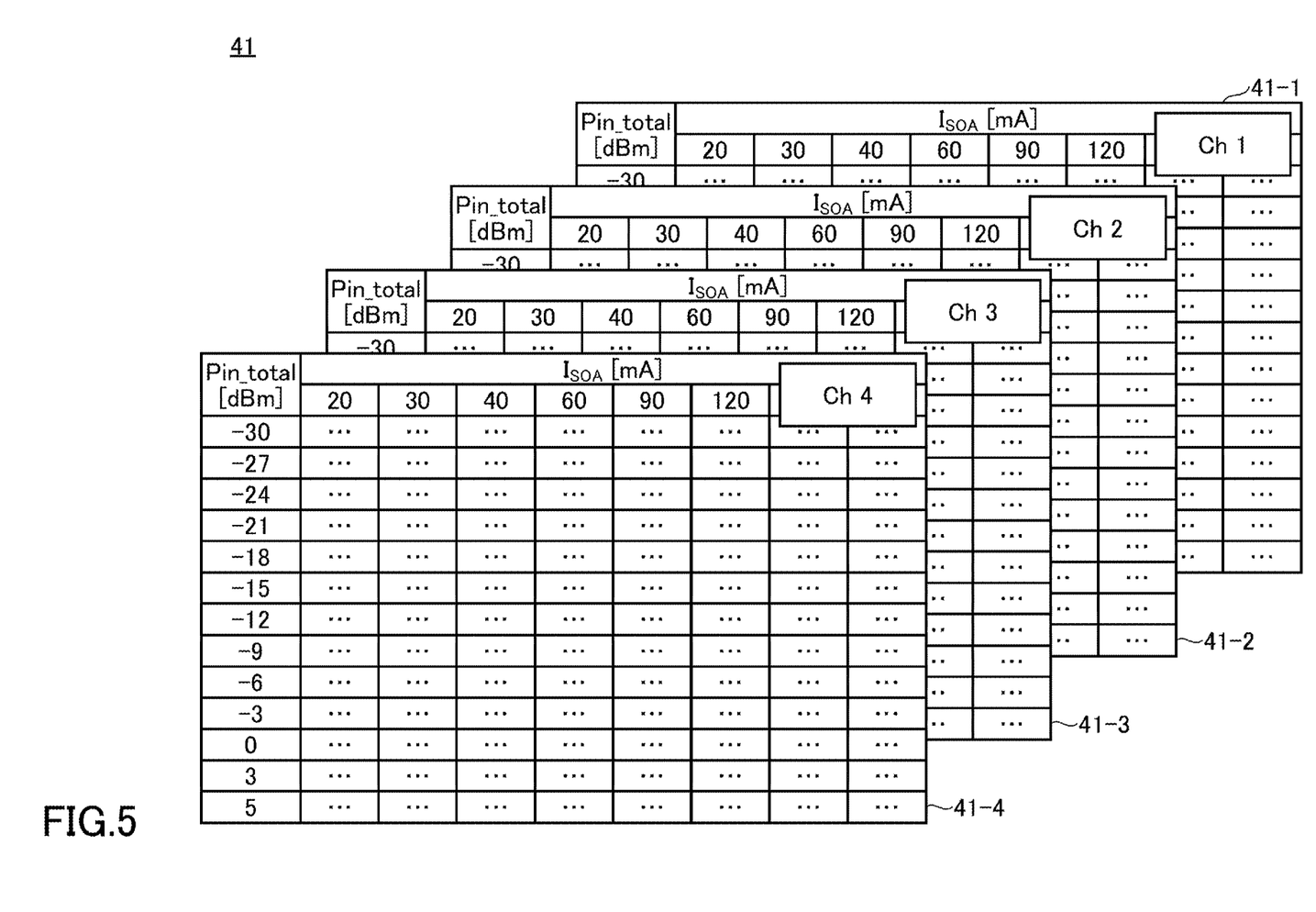
FIG. 5 illustrates an example of a gain table.

FIG. 5 illustrates an example of the gain table 41 saved in the memory 40. Gain tables 41-1 to 41-4 are provided corresponding to channels Ch1 to Ch4 in this example, assuming a 4-channel WDM signal.

For each channel, SOA gains (dB) are recorded, each being specified by a SOA drive current $I_{SOA}$ (mA) and a total incident light intensity (dBm) of the WDM signal incident onto the SOA 11. The recorded values of the SOA gain, each being determined by a drive current $I_{SOA}$ (mA) of the SOA 11 and a SOA total incident light intensity Pin_total (dBm), are measured in advance for each of the channels.

Figure 6:
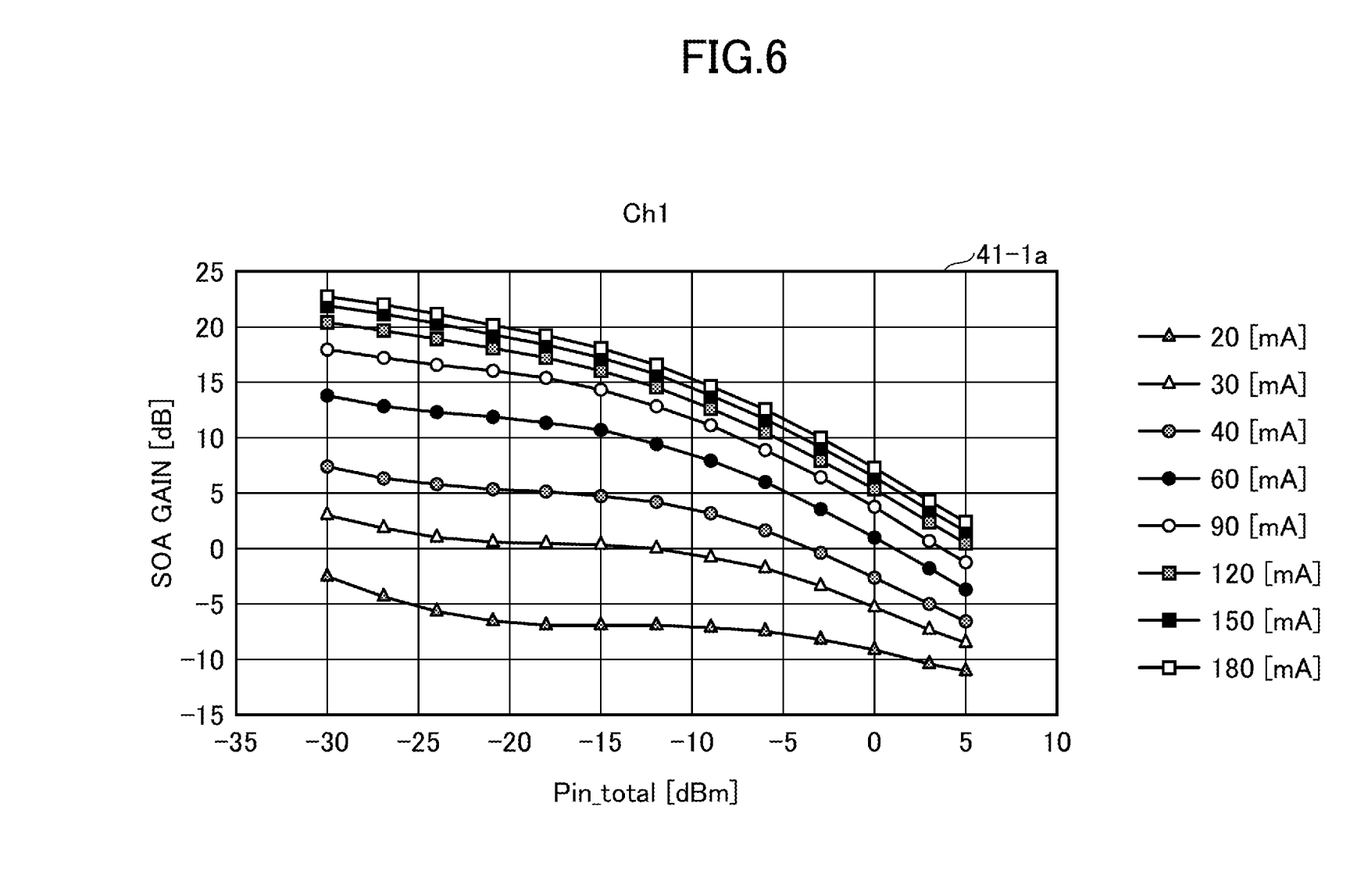
FIG. 6 illustrates information of a channel (ch1) described in the gain table, as characteristic curves.

FIG. 6 illustrates information items recorded in, for example, the gain table 41-1 of channel Ch1 of FIG. 5, the table being illustrated as a characteristic diagram 41-1a in FIG. 6. The horizontal axis represents SOA total incident light intensity Pin_total, and the vertical axis represents SOA gain. The SOA gain is defined as a function of the SOA total incident light intensity for each of the eight values of the SOA drive current $I_{SOA}$ ranging from 20 mA to 180 mA.

The first calculator 31 of the processor 30 determines SOA gains of the respective channels, referring to gain tables 41-1 to 41-4, based on the SOA drive current $I_{SOA}$ configured in the current source 16 and the SOA total incident light intensity provisionally configured as the initial value or repeatedly calculated during the iterative estimation process. The second calculator 32 calculates the channel-based SOA incident light intensities based on the SOA gains of the respective channels and the monitoring results of PIN-PDs 13a to 13d.

The third calculator 33 calculates a new SOA total incident light intensity Pin_total_new from the summation of the SOA incident light intensities of the respective channels.

The calculations performed by the processor 30 are expressed by the following formula.

$$Pin\_ch_n = (PIN\_PD\_in_n \div LOSS_n) \div G_n$$

$$Pin\_total\_new = \sum_{i=1}^{n}(Pin\_ch_i)$$

where Pin_ch n denotes the SOA incident light intensity of individual channel.

Multiplication of the channel-based SOA incident light intensity Pin_ch n by the SOA gain and by the optical loss of that channel gives the PD incident light intensity, which represents the intensity of the signal light incident onto the associated PIN PD after demultiplexing. "LOSSn" denotes the optical loss at channel "n" caused by the optical demultiplexer 12. The channel-based SOA incident light intensity Pin_ch n is expressed as a quotient obtained by dividing the PD incident light intensity PDin_ch n by the optical loss "LOSSn" caused by the optical demultiplexer 12 and by the SOA gain "Gn" of that channel. The SOA gains "Gn" of the respective channels are acquired from the gain tables 41-1 to 41-4, based on the SOA drive current $I_{SOA}$ and the provisional SOA total incident light intensity. A new SOA total incident light intensity Pin_total_new is acquired by totalizing the channel-based SOA incident light intensities Pin_ch n of the respective channels.

With the simple formula, the SOA total incident light intensity is repeatedly calculated until the new SOA total incident light intensity Pin_total_new converges.

Figure 7:
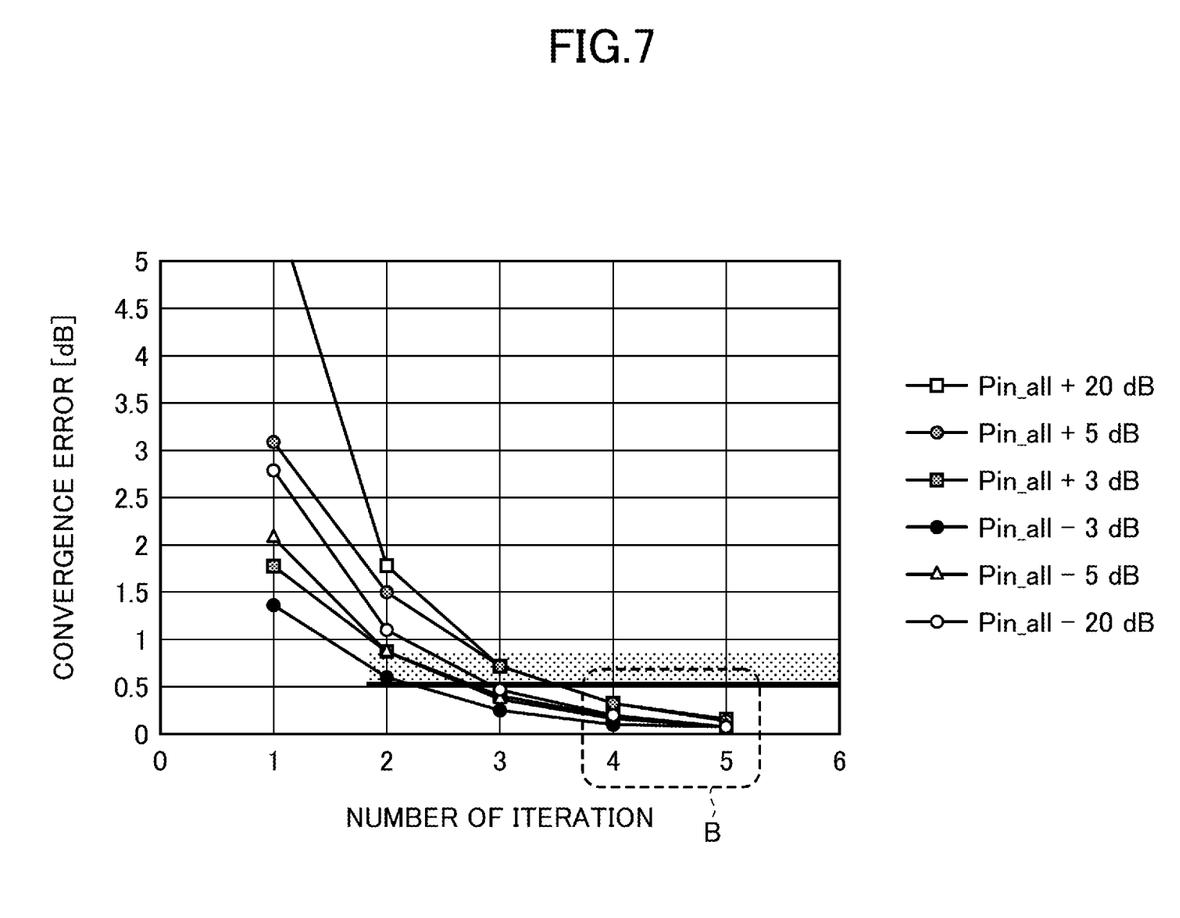
FIG. 7 illustrates an experimental result of error convergence in detection of incident light intensity by iterative calculation.

FIG. 7 illustrates the experimental result of convergence of the detection error of the incident light intensity of a certain channel by the above-described iteration. The convergence state is calculated by changing the error before the operation in the range of ±20 dB. The error converges to less than 0.5 dB by iterating the calculation four times or more, as indicated by the circled region B in the figure. If the initial setup value (i.e., the provisional value) of the SOA total incident light intensity is within ±3 dB error from the true value, then the error converges to less than 0.5 dB by only 3-time iteration.

It is understood from the result of FIG. 7 that the SOA total incident light intensity quickly and accurately converges to the expected value by iterating the calculation four times or more, even if the initially selected provisional value of the SOA total incident light intensity is considerably different from the actual value. Depending on the system design, the number of iterations may be limited to a predetermined number, for example, three times. In such a case, selecting an initial value with less error is preferable because of the faster convergence.

Figure 8:
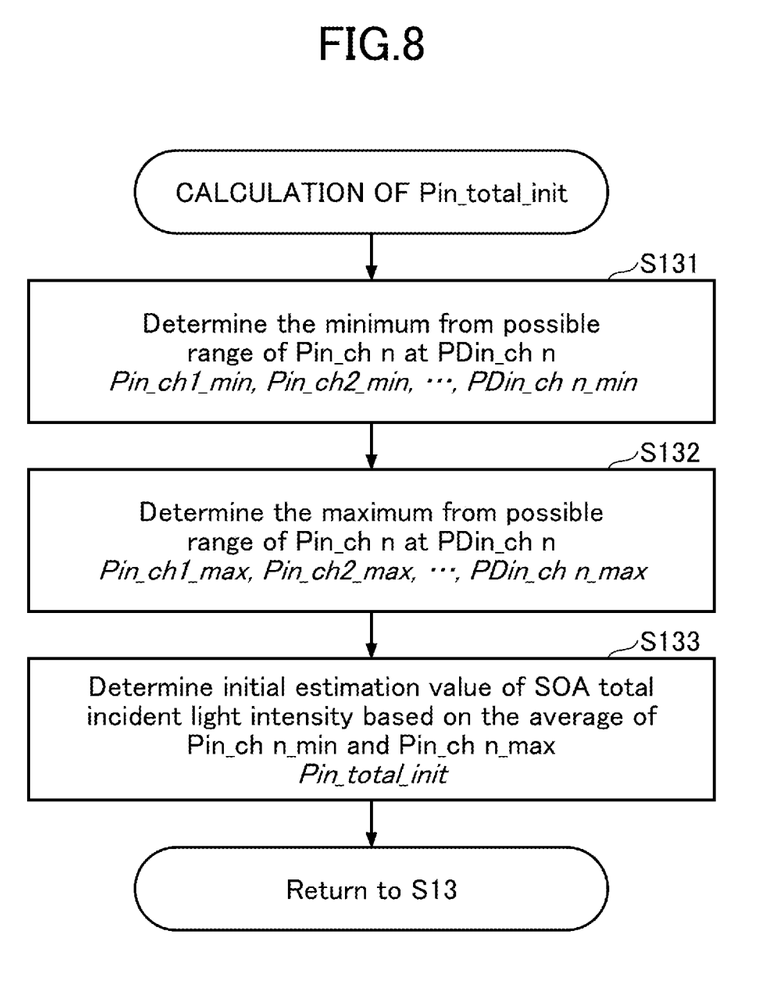
FIG. 8 is a flowchart of a process for calculating the initial value of the total incident light intensity of an optical signal incident onto the SOA.

FIG. 8 is a flowchart of a calculation example of the initial value of the provisional SOA total incident light intensity. The initial value of the SOA total incident light intensity can be narrowed to a closer value to some extent, based on the SOA drive current $I_{SOA}$, the gain table 41, and the PD incident light intensities of the PIN-PDs 13a to 13d. For example, using a median or an average between the maximum possible error and the minimum possible error, the provisional value of the SOA total incident light intensity can be brought to be closer to the actual SOA total incident light intensity to some extent.

First, as for the light intensity PDin_ch n of each wavelength amplification by the SOA 11, demultiplexed, and input to the associated PIN-PD 13n, the minimum value Pin_ch n_min is determined from the possible range of the channel-based SOA incident light intensity Pin_ch n (S131). Similarly, as for the light intensity PDin_ch n of each wavelength incident onto the associated PIN-PD 13n, the maximum value Pin_ch n_max is determined from the possible range of the channel-based SOA incident light intensity Pin_ch n (S132). Steps S131 and S132 may be performed in arbitrary order, or may be simultaneously performed.

The average of the sum of the minimum values Pin_ch n_min of all the channels and the sum of the maximum values Pin_ch n_max of all the channels is calculated and determined as the initial value of the SOA total incident light intensity (S133).

Figure 9:
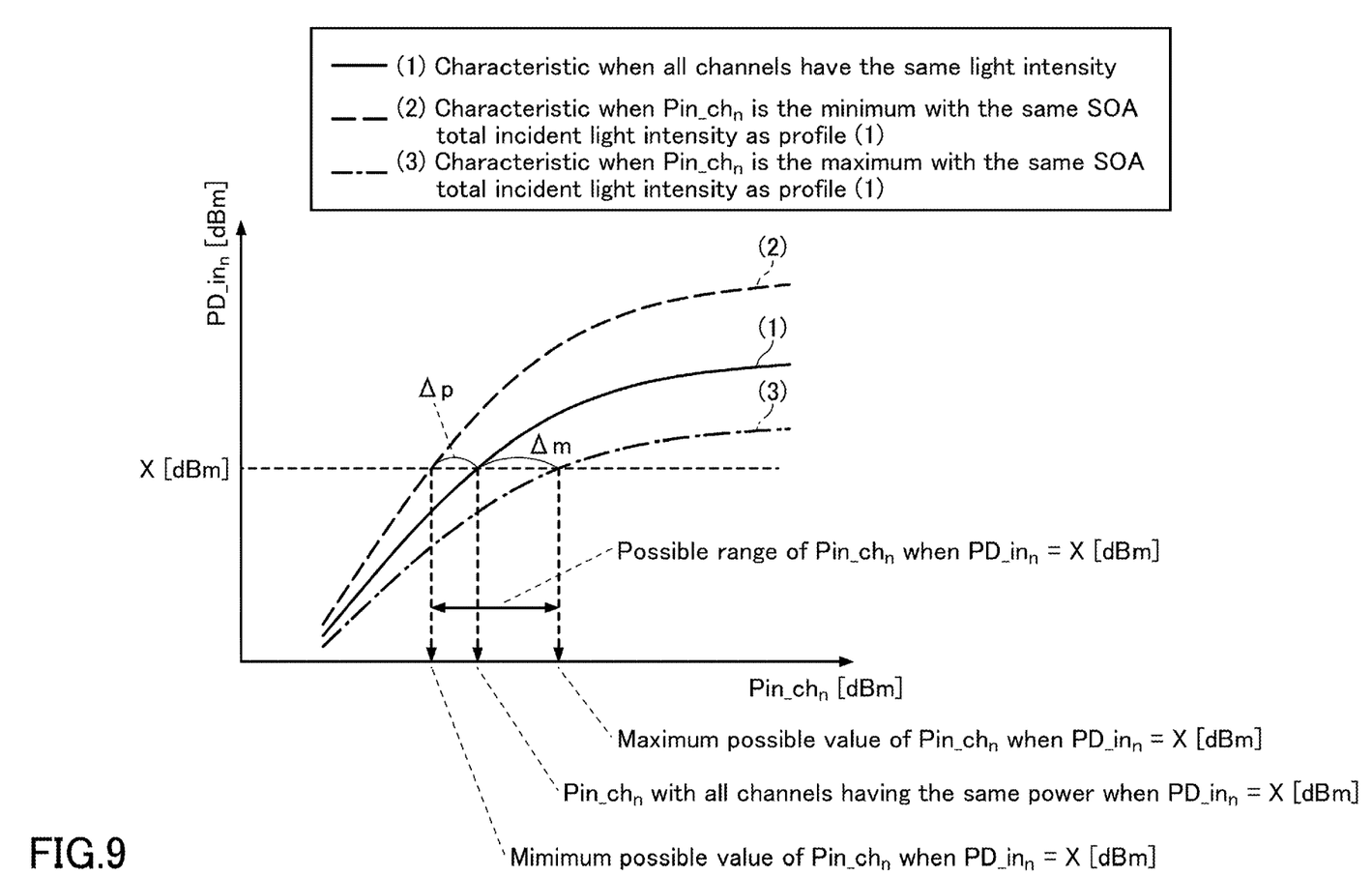
FIG. 9 illustrates an example of calculation of an initial value for estimating the total incident light intensity of the optical signal incident onto the SOA.

FIG. 9 illustrates an example of calculation of the initial value for the SOA total incident light intensity. The horizontal axis represents the incident light intensity Pin_ch of each channel incident onto the SOA, and the vertical axis represents the incident light intensity PD_in n incident onto the associated PIN-PD 13n.

The solid line (1) represents the characteristic of a case where all the channels have the same light intensity. The broken line (2) represents the characteristic of a case where the SOA total incident light intensity is the same as that of case (1), but a certain channel has the minimum value of the light intensity Pin_ch n incident onto the SOA 11. The dashed-dotted line (3) represents the characteristic of a case where the SOA total incident light intensity is the same as that of case (1), but a certain channel has the maximum value of the light intensity Pin_ch n incident onto the SOA 11. These characteristics of the lines (1) to (3) are measured in advance and saved in the memory 40.

The intersection of the line (1) and the horizontal dotted line at X (dBm) of PD_in n indicates the SOA incident light intensity of the respective channels when all the channels have the same light intensity. The intersection of the line (2) and the horizontal dotted line at X (dBm) of PD_in n indicates the minimum value that the channel-based SOA incident light intensity Pin_ch n can possibly take when PD_in n is X (dBm).

The intersection of the line (3) and the horizontal dotted line at X (dBm) of PD_in n indicates the maximum value that the channel-based SOA incident light intensity Pin_ch n can possibly take when PD_in n is X (dBm).

The minimum value Pin_ch n_min of the channel-based SOA incident light intensity can be determined by, for example, the following formula.

$$\begin{cases} \text{PDin\_ch}_n = G_n \times \text{Pin\_ch}_n\_\text{min} \\ \text{Pin\_ch}_n\_\text{min} = \text{Pin\_total} \div Div1 \\ Div1 = 4 \times \partial p = 4 \times 10^{\Delta p/10} \end{cases}$$

The channel-based PD incident light intensity incident onto the associated PIN-PD 13n is acquired by multiplying the minimum value Pin_ch n_min of the SOA incident light intensity of the corresponding channel by the associated SOA gain Gn. That is, the line (2) in FIG. 9 represents the characteristic of the SOA gain Gn which minimizes the Pin_ch n.

The minimum value Pin_ch n_min of the channel-based SOA incident light intensity is acquired by dividing the SOA total incident light intensity Pin_total by "div1". In the case of 4 channels, div1 is expressed as $4 \times \partial p$, that is, $4 \times 10^{\Delta p/10}$, where $\Delta p$ is the difference between the line (1) and the line (2) at X (dBm) of PD_in n in FIG. 9. Only $\Delta p$ has a unit of [dB] (logarithm), and the rest is expressed in antilogarithm.

The maximum value Pin_ch n_max of the channel-based SOA incident light intensity can be acquired by, for example, the following formula.

$$\begin{cases} \text{PDin\_ch}_n = G_n \times \text{Pin\_ch}_n\_\text{max} \\ \text{Pin\_ch}_n\_\text{max} = \text{Pin\_total} \div Div2 \\ Div2 = 4 \times \partial m = 4 \times 10^{\Delta m/10} \end{cases}$$

The channel-based PD incident light intensity incident onto the corresponding PIN-PD 13n is acquired by multiplying the maximum value Pin_ch n_max of the SOA incident light intensity of the corresponding channel by the associated SOA gain Gn. That is, the line (3) in FIG. 9 represents the characteristic of the SOA gain Gn which maximizes Pin_ch n.

The maximum value Pin_ch n_max of the channel-based SOA incident light intensity is acquired by dividing the SOA total incident light intensity Pin_total by "div2". In the case of 4 channels, div2 is expressed as $4 \times \partial m$, that is, $4 \times 10^{\Delta m/10}$, where $\Delta m$ is the difference between the line (1) and the line (3) at X (dBm) of PD_in n in FIG. 9. Only am has a unit of [dB] (logarithm), and the rest is expressed in antilogarithm.

By saving the characteristics of the three lines (1) to (3) in FIG. 9, namely, the three types of gain characteristics or tables in the memory 40, and by retrieving a location that satisfies the calculation formula of Pin_ch n_min, the minimum value of Pin_ch n_min of the SOA incident light intensity of each channel can be easily determined.

The maximum value Pin_ch n_max of the SOA incident light intensity of each channel can be easily determined by searching in the three gain tables for the location that satisfies the calculation formula of Pin_ch n_max.

The initial value Pin_total_init of the SOA total incident light intensity can be calculated by the following formula.

$$\text{Pin\_total\_init} = 10^{\{\Sigma 10 \cdot \log(\text{Pin\_chn\_min}) + \Sigma 10 \cdot \log(\text{Pin\_chn\_max})\}/2/10}$$

The meaning of this arithmetic expression is determining the average of the sum of Pin_ch n_min and the sum of Pin_ch n_max of all the channels in logarithm, and then converting the average into an antilogarithm. This is because if the average of the sum of Pin_ch n_min and the sum of Pin_ch n_max of all the channels is calculated in antilogarithm, the average may slant toward the Pin_ch n_max side.

By saving the three types of characteristics (gain tables) of FIG. 9 in the memory 40, the initial value of the SOA total incident light intensity can be easily calculated under the situation where the number of iterations is limited. The calculated initial value can be used as the provisional value of the SOA total incident light intensity for starting the iteration.

According to the above-described process, the incident light intensities of the respective channels of the WDM signal incident onto the SOA can be accurately estimated by the iteration, without directly measuring the incident light intensity of the WDM signal incident onto the SOA 11. With the above-described configuration, the number of parts or components of the optical receiver 5 can be reduced, and the module can be made compact, while expanding the dynamic range of the incident light.

Although the disclosure has been described based upon specific configuration examples, the disclosure is not limited to the above-described examples. In the case where the number of iterations is limited, the initial value of the provisional SOA total incident light intensity may be determined by calculating the average of Pin_ch n_min and Pin_ch n_max for each of the channels, and then calculating the average or the median of all the channels, instead of calculating the average of the total of the Pin_ch n_min and the total of the Pin_ch n_max of all the channels. If there is no restriction on the number of iterations, then any value can be randomly selected for the initial value of the SOA total incident light intensity because of the fast convergence of the process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. An optical receiver comprising:
   an optical amplifier that amplifies an optical signal in which multiple wavelengths are multiplexed;
   a current source that drives the optical amplifier;
   an optical demultiplexer that demultiplexes the amplified optical signal into the multiple wavelengths;
   photodetectors, each detecting one of the demultiplexed wavelengths;
   a monitor circuit that monitors light intensities of the demultiplexed wavelengths detected by the photodetectors;
   a processor; and
   a memory,
   wherein the memory has information representing a relationship between a total incident light intensity of the optical signal incident onto the optical amplifier and a gain of the optical amplifier for each of the multiple wavelengths, and
   wherein the processor repeats
   first calculation for determining the gain of each of the multiple wavelengths of the optical signal, with reference to the information in the memory, based on a drive current of the current source and an estimation value of the total incident light intensity of the optical signal incident onto the optical amplifier, second calculation for calculating an incident light intensity of each of the multiple wavelengths of the optical signal incident onto the optical amplifier, based on the determined gain of each of the multiple wavelengths and a monitored light intensity of each of the demultiplexed wavelengths acquired from the monitor circuit, and third calculation for calculating the total incident light intensity of the optical signal incident onto the optical amplifier based on a sum of incident light intensities of the multiple wavelengths acquired by the second calculation until the total incident light intensity converges.

2. The optical receiver as claimed in claim 1, wherein the processor uses a provisional value of the total incident light intensity of the optical signal at a beginning of repetition of the first calculation, the second calculation, and the third calculation.

3. The optical receiver as claimed in claim 1, wherein the processor calculates an initial estimation value of the total incident light intensity of the optical signal based on the drive current, the information saved in the memory, and the monitored light intensity acquired from the monitor circuit.

4. The optical receiver as claimed in claim 3, wherein the processor calculates an average or a median of a total of possible maximum values and a total of possible minimum values of the incident light intensities of the multiple wavelengths of the optical signal incident onto the optical amplifier, as the initial estimation value of the total incident light intensity of the optical signal.

5. The optical receiver as claimed in claim 1, wherein the processor outputs the incident light intensities of the multiple wavelengths of the optical signal incident onto the optical amplifier when the total incident light intensity converges.

6. The optical receiver as claimed in claim 5, further comprising:

a control and supervisory circuit that utilizes the incident light intensities of the multiple wavelengths of the optical signal incident onto the optical amplifier for internal control of the optical receiver.

7. An optical transceiver module comprising:

an optical receiver; and an optical transmitter that converts an electrical signal into an optical signal, wherein the optical receiver includes an optical amplifier that amplifies an optical signal in which multiple wavelengths are multiplexed, a current source that drives the optical amplifier, an optical demultiplexer that demultiplexes the amplified optical signal into the multiple wavelengths, photodetectors, each detecting one of the demultiplexed wavelengths, a monitor circuit that monitors light intensities of the demultiplexed wavelengths detected by the photodetectors, a processor, and a memory, wherein the memory has information representing a relationship between a total incident light intensity of the optical signal incident onto the optical amplifier and a gain of the optical amplifier for each of the multiple wavelengths, and wherein the processor repeats first calculation for determining the gain of each of the multiple wavelengths of the optical signal, with reference to the information in the memory, based on a drive current of the current source and an estimation value of the total incident light intensity of the optical signal incident onto the optical amplifier, second calculation for calculating an incident light intensity of each of the multiple wavelengths of the optical signal incident onto the optical amplifier, based on the determined gain of each of the multiple wavelengths and a monitored light intensity of each of the demultiplexed wavelengths acquired from the monitor circuit, and third calculation for calculating the total incident light intensity of the optical signal incident onto the optical amplifier based on a sum of incident light intensities of the multiple wavelengths acquired by the second calculation, until the total incident light intensity converges.

8. The optical transceiver module as claimed in claim 7, wherein the processor uses a provisional value of the total incident light intensity of the optical signal at a beginning of repetition of the first calculation, the second calculation, and the third calculation.

9. The optical transceiver module as claimed in claim 7, wherein the processor calculates an initial estimation value of the total incident light intensity of the optical signal based on the drive current, the information saved in the memory, and the monitored light intensity acquired from the monitor circuit.

10. The optical transceiver module as claimed in claim 9, wherein the processor calculates an average or a median of a total of possible maximum values and a total of possible minimum values of the incident light intensities of the multiple wavelengths of the optical signal incident onto the optical amplifier, as the initial estimation value of the total incident light intensity of the optical signal.

11. The optical transceiver module as claimed in claim 7, wherein the processor outputs the incident light intensities of the multiple wavelengths of the optical signal incident onto the optical amplifier when the total incident light intensity converges.

12. The optical transceiver module as claimed in claim 11, wherein the optical receiver has a control and supervisory circuit that utilizes the incident light intensities of the multiple wavelengths of the optical signal incident onto the optical amplifier for internal control of the optical receiver.

* * * * *